United States Patent
Druskin et al.

(10) Patent No.: US 9,529,110 B2
(45) Date of Patent: Dec. 27, 2016

(54) CONSTRUCTING A REDUCED ORDER MODEL OF AN ELECTROMAGNETIC RESPONSE IN A SUBTERRANEAN STRUCTURE

(75) Inventors: Vladimir Druskin, Brookline, MA (US); Mikhail Zaslavsky, Brighton, MA (US)

(73) Assignee: WESTERNGECO L. L. C., Houston, TX (US)

(*) Notice: Subject to any disclaimer, the term of this patent is extended or adjusted under 35 U.S.C. 154(b) by 1914 days.

(21) Appl. No.: 12/356,562

(22) Filed: Jan. 21, 2009

(65) Prior Publication Data

US 2009/0248373 A1    Oct. 1, 2009

Related U.S. Application Data

(60) Provisional application No. 61/041,001, filed on Mar. 31, 2008.

(51) Int. Cl.
| | | |
|---|---|---|
| G06F 7/60 | (2006.01) | |
| G01V 3/12 | (2006.01) | |
| G01V 3/08 | (2006.01) | |
| G01V 99/00 | (2009.01) | |
| G01V 3/30 | (2006.01) | |

(52) U.S. Cl.
CPC ............... G01V 3/12 (2013.01); G01V 3/083 (2013.01); G01V 3/30 (2013.01); G01V 99/005 (2013.01)

(58) Field of Classification Search
CPC ....................................... G01V 99/005
USPC .............................. 324/337, 338; 703/2, 10
See application file for complete search history.

(56) References Cited

U.S. PATENT DOCUMENTS

| | | | | |
|---|---|---|---|---|
| 5,583,825 | A  * | 12/1996 | Carrazzone et al. | 367/31 |
| 6,038,389 | A  * | 3/2000 | Rahon et al. | 703/10 |
| 6,381,543 | B1 * | 4/2002 | Guerillot et al. | 702/13 |
| 6,687,658 | B1 * | 2/2004 | Roychowdhury | 703/2 |
| 6,819,628 | B2 * | 11/2004 | Tal-Ezer | 367/51 |
| 7,026,819 | B2 * | 4/2006 | Eidesmo et al. | 324/337 |
| 7,474,101 | B2 * | 1/2009 | Strack | 324/323 |
| 7,643,942 | B2 * | 1/2010 | Wahrmund et al. | 702/13 |
| 7,860,655 | B2 * | 12/2010 | Alumbaugh et al. | 702/11 |
| 2003/0130796 | A1 * | 7/2003 | Wiggins | G01V 1/282 702/14 |
| 2004/0124842 | A1 * | 7/2004 | Eidesmo et al. | 324/337 |

(Continued)

FOREIGN PATENT DOCUMENTS

| | | |
|---|---|---|
| RU | 2145101 C1 | 1/2000 |
| RU | 2300126 C1 | 5/2007 |

(Continued)

OTHER PUBLICATIONS

Wikipedia Definition of Krylov Subspace p. 1, Dated: Jul. 10, 2006, (http://en.wikipedia.org/wiki/Krylov_subspace).*

(Continued)

*Primary Examiner* — Akash Saxena
(74) *Attorney, Agent, or Firm* — Abimbola Bukoye

(57) ABSTRACT

To construct a reduced order model of a subterranean structure, a model reduction algorithm is applied to produce the reduced order model that is an approximation of a true model of the subterranean structure. The model reduction algorithm uses interpolating frequencies that are purely imaginary to enhance computational efficiency of the algorithm.

13 Claims, 3 Drawing Sheets

(56) References Cited

U.S. PATENT DOCUMENTS

| | | | |
|---|---|---|---|
| 2006/0129322 A1* | 6/2006 | MacGregor et al. | 702/13 |
| 2007/0061080 A1* | 3/2007 | Zhdanov | 702/7 |
| 2007/0280047 A1* | 12/2007 | MacGregor et al. | 367/15 |
| 2009/0119076 A1* | 5/2009 | Madatov et al. | G01V 1/282 703/2 |
| 2009/0166033 A1* | 7/2009 | Brouwer et al. | 703/2 |
| 2009/0306943 A1* | 12/2009 | Abdel-Khalik et al. | 703/2 |
| 2010/0299126 A1* | 11/2010 | Chugunov et al. | 703/10 |
| 2011/0046931 A1* | 2/2011 | Van Geemert | 703/2 |

FOREIGN PATENT DOCUMENTS

| | | | |
|---|---|---|---|
| RU | 2300786 C2 | 6/2007 | |
| RU | 2321064 C2 | 3/2008 | |
| RU | 2010140067 A | 5/2012 | |
| WO | WO 9828637 A2 * | 7/1998 | G01V 3/28 |
| WO | 2008-005690 A2 | 1/2008 | |

OTHER PUBLICATIONS

A Rational Lanczos Algorithm for Model Reduction II Interpolation Point Selection, E_ Grimme and K_ Gallivan, pp. 1-18 Numerical Algorithms, year=1998, vol. 12.*

Rational Krylov Algorithms for Eigenvalue Computation and Model Reduction; Axel Ruhe et al. pp. 1-12, Jun. 17, 1998.*

Borner, et al, Fast 3-D Simulation of Transient Electromagnetic Fields by Model Reduction in the Frequency Domain using Krylov Subspace Projection, Geophysics Journal International, 2008, pp. 766-780, vol. 173.

Davydycheva, et al, An Efficient Finite-Difference Scheme for Electromagnetic Logging in 3D Anisotropic Inhomogeneous Media, Geophysics, Sep.-Oct. 2003, pp. 1525-1536, vol. 68, No. 5.

Ingerman, et al, Optimal Finite Difference Grids and Rational Approximations of the Square Root, Communications on Pure and Applied Mathematics, 2000, pp. 0001-0028, vol. 53.

Krebes, et al, Seismic Forward Modeling, CSEG Recorder, Apr. 2004, pp. 28-39.

Mulder, et al, Time-Domain Modeling of Electromagnetic Diffusion with a Frequency-Domain Code, Geophysics, Jan.-Feb. 2008, pp. F1-F8, vol. 73, No. 1.

Axel Ruhe, The Rational Krylov Algorithm for Large Nonsymmetric Eigenvalues—Mapping the Resolvent Norm (Pseudospectrum), Sparse Days at St. Girons, Jul. 10-16, 1994.

Axel Ruhe, The rational Krylov algorithm for nonsymmetric eigenvalue problems. III: Complex shifts for real matrices, BIT, 1994, v. 34, N 1, pp. 165-176.

Wu, et al., Model Order Reduction of Finite-Element Approximations of Passive Electromagnetic Devices Including Lumped Electrical-Circuit Models, IEEE Transactions on Microwave Theory and Techniques, Sep. 2004, pp. 2305-2313, vol. 52, No. 9.

Hall, et al., Reduced-Order Modelling of Unsteady Small-Disturbance Flows using a frequency-Domain Proper Orthogonal Decomposition Technique, American Institute of Aeronautics and Astronautics, 1999, p. 1 only.

PCT Search Report, dated Nov. 10, 2009, Application No. PCT/US2009/039017.

Gallivan K., et al., "A rational Lanczos alogrithm for model reduction", Numerical Alogrithms, Apr. 1, 1996, pp. 33-63, NL ISSN 1017-1398, vol. 12, Nr. 1, Baltzer, Amsterdam, NL.

Hall K.C. et al., "Reduced-Order Modelling of Unsteady Small-Disturbance Flows Using a Frequency-Domain Proper Orthogonal Decomposition Technique", Jan. 1, 1999, pgs. 1-12, AIAA Paper 99/0655, 37th Aerospace Science Meeting and Exhibit, American Institute of Aeronautics & Astronautics, Reno, NV U.S.A.

Wu H. And Cangellaris A.C., "Model-Order Reduction of Finite-Element Approximations of Passive Electromagnetic Devices Including Lumped Electrical-Circuit Models", Sep. 1, 2004, pp. 2305-2313, IEE Transactions on Microwave Theory and Techniques, vol. 52, No. 9, IEE Service Center, Piscataway, NJ U.S.A.

Supplemental European Search Report of European Patent Application No. 09755404.2 dated Feb. 12, 2012.

Druskin, V. L.., et al., "A spectral semi-discrete method for the numerical solution of three-dimensional non-stationary electrical prospecting problems", Izv. Acad. Sci. USSR, Physics of Solid Earth, N8, pp. 641-648.

PCT/US2009/039017 Written Opinion dated Nov. 10, 2009, 3 pgs.

RU Application No. 2010140067, Office Action dated Dec. 14, 2011, 7 pgs.

RU Application No. 2010140067, Decision on Grant dated Apr. 17, 2012, 2011, 11 pgs.

* cited by examiner

CONSTRUCTING A REDUCED ORDER MODEL OF AN ELECTROMAGNETIC RESPONSE IN A SUBTERRANEAN STRUCTURE

CROSS-REFERENCE TO RELATED APPLICATIONS

This claims the benefit under 35 U.S. C. §119(e) of U.S. Provisional Application Ser. No. 61/041,001, filed Mar. 31, 2008, which is hereby incorporated by reference.

TECHNICAL FIELD

The invention relates generally to constructing reduced order models for modeling an electromagnetic response in a subterranean structure.

BACKGROUND

Various electromagnetic techniques exist to perform surveys of subterranean structures underneath a surface for identifying structures of interest. Examples of structures of interest in the subterranean structure include subsurface resistive bodies, such as oil-bearing reservoirs, gas injection zones, and fresh-water aquifers. One survey technique is the magnetotelluric (MT) survey technique that employs time measurements of electric and magnetic fields (which are responsive to naturally occurring electromagnetic fields) for determining the electrical conductivity distribution beneath the surface. Another survey technique is the controlled source electromagnetic (CSEM) survey technique, in which an electromagnetic transmitter is used to generate electromagnetic signals. With either survey technique, surveying units (or receivers) containing electric and magnetic field sensors are deployed on a surface within an area of interest to make measurements from which a geological survey of the subterranean structure underneath the surface can be derived.

Forward modeling is often performed to develop models for modeling the EM response in a subterranean structure. Typically, the forward modeling involves producing a mathematical model from which synthetic (simulated) EM data can be calculated. The synthetic EM data is then compared to real EM data, and if the synthetic data and EM data do not match to within predefined convergence criteria, the model is altered and the above process is repeated iteratively until a satisfactory match is obtained between the synthetic EM data and the real EM data.

Typically, a forward model is constructed for a relatively large frequency interval (containing multiple frequencies) and a relatively large time domain (including many time points). This results in relatively large forward models that are computationally expensive to compute and to use.

SUMMARY

In general, according to an embodiment, a technique is provided to construct a reduced order forward model of a survey signal response of a subterranean structure that approximates a true forward model for an entire frequency interval or time interval.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

The modeling of marine electromagnetic (EM) problems, such as magnetotelluric (MT) sounding and controlled-source EM (CSEM) problems, involves obtaining solutions for relatively large intervals in frequency and time domains. Some embodiments of the invention construct reduced order models to accurately approximate true forward models for entire frequency or time intervals with relatively low computational cost. The reduced order model is an approximate forward model that models the response of a subterranean structure to a survey signal, such as an electromagnetic (EM) signal generated by a controlled EM transmitter, a naturally occurring EM signal, or a seismic signal. The reduced order model can be used to generate synthetic data that represents a simulated version of the expected response of a subterranean structure for a given input signal.

Some embodiments are used to develop a fast and robust numerical algorithm based on general model reduction approaches that are based on optimal selection of interpolating frequencies. In some embodiments, the interpolating frequencies are selected to be purely imaginary (non-real) frequencies to improve efficiencies in solving for the reduced order model. The interpolating frequencies refer to the frequencies at which solutions are obtained that make up (span) a subspace referred to as a Rational Krylov Subspace (RKS). For frequency domain problems, the reduced order model is constructed using a Galerkin projection onto a Rational Krylov Subspace (RKS).

Several frequency domain problems for the selected interpolating frequencies are solved using a preconditioned solver. The Rational Krylov Subspace spanned on such solutions is formed, and the Galerkin problem is solved. By choosing purely imaginary interpolating frequencies, the main computations for deriving the reduced order model can be accomplished using real arithmetic, which significantly reduces computation cost compared to conventional frequency domain simulations using contour integration. The approach of solving the problem of deriving the reduced order model based on selecting purely imaginary interpolating frequencies can also be extended to time domain problems. The superior approximation property of the RKS model reduction technique allows significant reduction of the subspace size compared to the size of the standard (polynomial) Krylov subspace used in conventional techniques, e.g., Spectral Lanczos Decomposition Method (SLDM).

Figure 1:
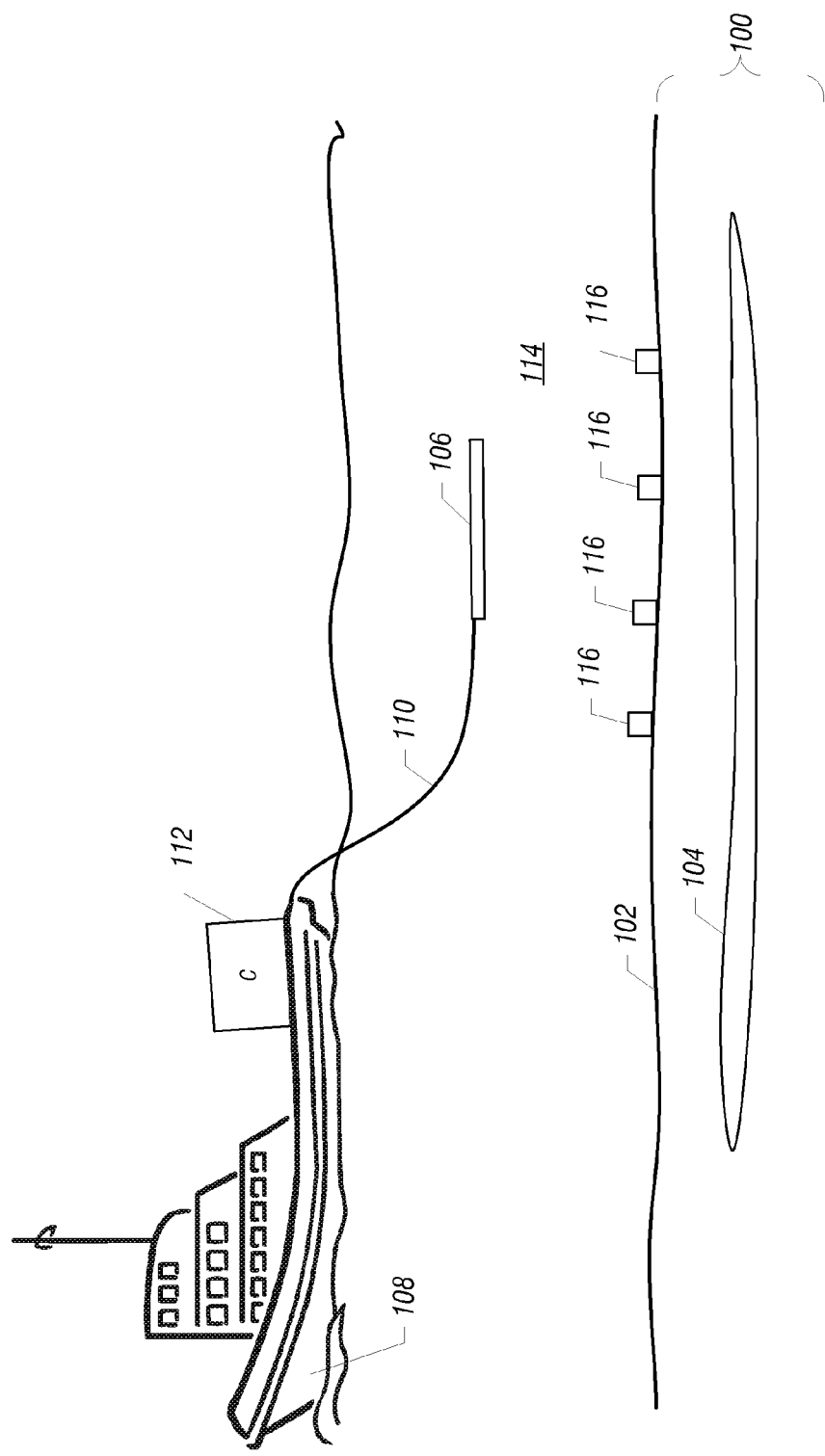
FIG. 1 is a schematic diagram of an arrangement to perform surveying with respect to a subterranean structure, in which an embodiment of the invention can be incorporated.

FIG. 1 illustrates an exemplary arrangement for performing a survey of a subterranean structure in a marine environment. As depicted in FIG. 1, controlled source electromagnetic (CSEM) surveying is performed of a subterranean structure 100 that is located below a water bottom surface 102 (e.g., sea floor). The subterranean structure 100 includes one or more subterranean elements 104 of interest, where the one or more subterranean elements can include a hydrocarbon-bearing reservoir, gas injection zone, fresh-water aquifer, or other elements of interest.

A controlled EM source (transmitter) 106 is towed by a marine vessel 108 by a tow cable 110. A controller 112 on the marine vessel can send control signals to the controlled source 106 to activate the controlled EM source 106 to emit EM fields that are propagated through a body of water 114 into the subterranean structure 100.

A line or array of EM receivers 116 are provided on the water bottom surface 102, where the EM receivers 116 are able to detect EM fields affected by the subterranean structure 100. The EM receivers 116 include sensing elements for sensing magnetic and/or electric fields.

At some point, survey data collected by the EM receivers 116 are communicated to the controller 112 on the marine vessel 108 (or a remotely located controller). The survey data measured by the EM receivers 116 is collected over time; the survey data is presented as a time series to the controller 112. It is noted that the source signal produced by the EM transmitter 106 is also recorded by the controller 112 as a time series.

Although reference is made to a source signal that is produced by an EM transmitter in the above embodiment, it is noted that techniques according to some embodiments can also be applied in the magnetotelluric (MT) survey context, in which EM receivers 116 measure the response of the subterranean structure to a naturally occurring EM field. As yet another alternative, embodiments of the invention can also be applied to a seismic survey context, in which a seismic source (in place of the EM transmitter 106) is used for producing seismic signals that are propagated into the subterranean structure 100. Seismic receivers (in place of the EM receivers 116) are then used to measure seismic signals reflected from the subterranean structure 100. The seismic source signal produced by the seismic source can also be recorded as a time series, in this alternative embodiment.

Moreover, even though FIG. 1 depicts a marine survey acquisition system, it is noted that in an alternative implementation, a land-based survey acquisition system can be employed. Techniques according to some embodiments can also be used with a land-based acquisition system.

The reduced order forward model constructed according to some embodiments is used to model the response of the subterranean structure 100 in response to an input survey signal, such as the survey signal generated by the EM transmitter 106.

The following presents some background information prior to discussion of the algorithm for constructing the reduced order forward model. Consider the following frequency domain Maxwell equations in three-dimensional (3D) space $R^3$ with variable coefficients in 3D space:

$$\nabla \times E = i\omega\mu H,$$

$$\nabla \times H = \sigma E + J', \quad \text{Eq. (1)}$$

with homogeneous boundary conditions at infinity. Here, i represents an imaginary unit, E is the vector electric field, H is the vector magnetic field induced by an external current J' (current of the EM transmitter used in an EM survey), $\omega$ is frequency, $\mu$ is the magnetic permeability, which is assumed to be constant throughout the whole domain, and $\sigma$ is the anisotropic electrical conductivity (also assumed to be constant).

The magnetic field formulation has a form $$(A - i\omega I)H = b, \quad \text{Eq. (2)}$$

where $A = \nabla \times \mu^{-1} \sigma^{-1} \nabla \times$ is the second order Maxwell operator, $\quad$ Eq. (3)

$b = \nabla \times \mu^{-1} \sigma^{-1} J'$ is the magnetic source term, $\quad$ Eq. (4)

and I is the identity operator. In the equations above, H, J', $\mu$, and $\sigma$ are known values, based on measurements collected in the field (such as using the survey arrangement depicted in FIG. 1).

The time domain formulation for the magnetic field has a form $$\left(A + \frac{\partial}{\partial t}\right)H = 0, \, H|_{t=0} = b \quad \text{Eq. (5)}$$

Consider the computation of the forward model $f(A)b$, where $f$ is an analytic function in domain D, and assume that the spectrum of A belongs to D. For the frequency domain $f(A) = (A - i\omega I)^{-1}$, and for time domain $f(A) = e^{-tA}$.

The model reduction approach involves construction of an approximation to $f(A)b$ which is accurate and easy to compute. It is assumed that A and b are the discretized operator and source, respectively, i.e. $A \in R^{N \times N}$ and $b \in R^N$. Usually, reduced order models (ROMs) are constructed using a projection technique to a given subspace $K_n$ of low dimension $n \ll N$. Assuming that V is an orthogonal matrix of a basis in that subspace:

$$f(A)b \approx Vf(H)V^*b, \quad \text{Eq. (6)}$$

where $H = V^*AV$. Eq. (6) represents the Galerkin projection into the subspace $K_n$. For the frequency domain problem, the computation of $f(H)$ leads to very fast inversion of the n times n matrix V, since n is small. For the time domain problem, it will be shown below that $$Vf(H)V*b = \sum_{i=1}^{n} Vz_i f(\lambda_i)(z_i) * V * b,$$

where $(\lambda_i; z_i)_{i=1}^n$ are the eigenpairs of the matrix $H: Az_i = \lambda_i z_i$. Again, since n is small, the solution of this eigenvalue problem is computationally inexpensive. The difference between various projection methods is due to the choice of the projection space $K_n$.

In accordance with some embodiments, the reduced order model is constructed by performing the Galerkin projection according to Eq. (6) onto a Rational Krylov Subspace that is represented as $K_n = \text{span}\{(u_j = (A - i\omega_j I)^{-1}b\}_{j=1}^n$, which is a subspace spanned on the solutions with interpolating, non-coinciding purely imaginary frequencies $\omega_j$. The Galerkin projection according to Eq. (6) refers to the best approximation on $K_n$ for another frequency (other than the interpolating imaginary frequencies $\omega_j$), or for a time domain solution. Note that in the frequency domain, the Galerkin projection provides exact solutions at frequencies equal to the interpolating frequencies.

By making $\omega_j$ pure imaginary in accordance with some embodiments, $i\omega_j$ becomes real; as a result, the computation of $(A-i\omega_j I)^{-1} b$ in Eq. 2 can be performed in real arithmetic, which provides a significant computational advantage, because it involves the solution of real symmetric linear systems. Note that A is a real symmetric matrix; therefore, the computation of $(A-i\omega_j I)^{-1} b$ is accomplished by solving a real symmetric linear system. The solution of a real symmetric linear system can be performed using the pre-conditioned Conjugate Gradient Method, which is significantly faster than the solution of complex symmetric linear systems as in the traditional frequency domain approach with real frequencies.

In addition, $i\omega_j$ is selected as the so-called Zolotaryov nodes for a given spectral interval of A. The Zolotaryov nodes are interpolating points for a number of optimal rational approximations. The approximation solution of obtaining the reduced order model can be viewed as a rational approximation on the spectral interval of A, i.e., the projections of the solution on A's eigenvectors are rational functions of the respected eigenvalues.

Figure 2:
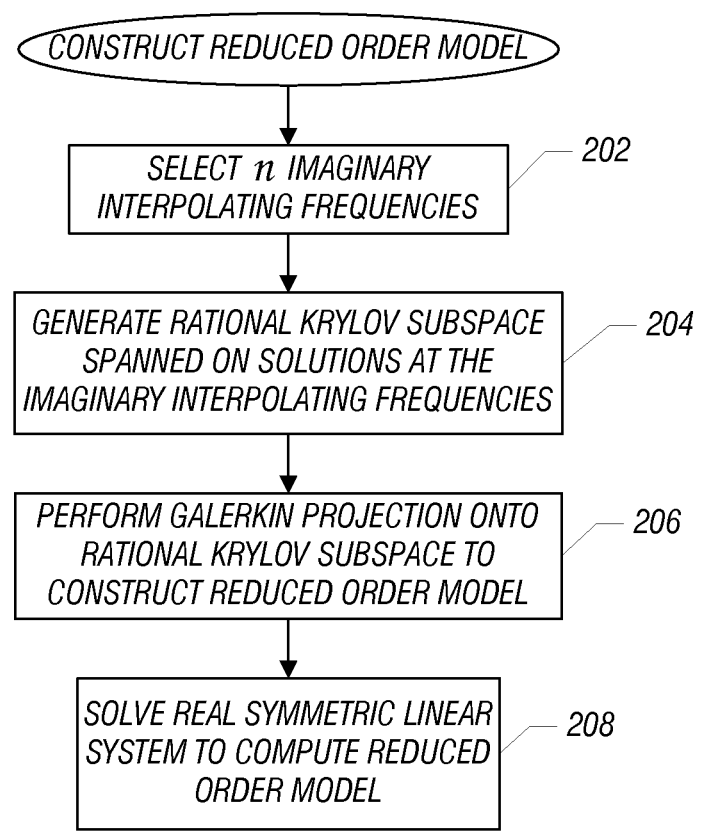
FIG. 2 is a flow diagram of a process of constructing a forward model that represents a survey signal response of a subterranean structure, in accordance with an embodiment.

FIG. 2 illustrates an exemplary flow diagram of a process of constructing a reduced order model according to an embodiment. The process can be performed by a processing system, such as the processing system depicted in FIG. 3.

The processing system selects (at 202) n imaginary interpolating frequencies $\omega_j$, j=1 to n. Based on the selected interpolating frequencies, the Rational Krylov Subspace $K_n$ is generated (at 204), where the Rational Krylov Subspace $K_n$ is spanned on solutions at the imaginary interpolating frequencies.

Next, the processing system performs (at 206) Galerkin projection onto the Rational Krylov Subspace $K_n$ to construct the reduced order model. In doing so, since imaginary interpolating frequencies are selected, the computations solve a real symmetric linear system to compute $(A-i\omega_j I)^{-1} b$.

The above algorithm generally describes a model reduction algorithm in which a reduced order model is constructed that approximates a true forward model of a subterranean structure. Once the reduced order model is constructed, it can be used to produce synthetic data that simulates the response of a subterranean structure to a survey signal.

Figure 3:
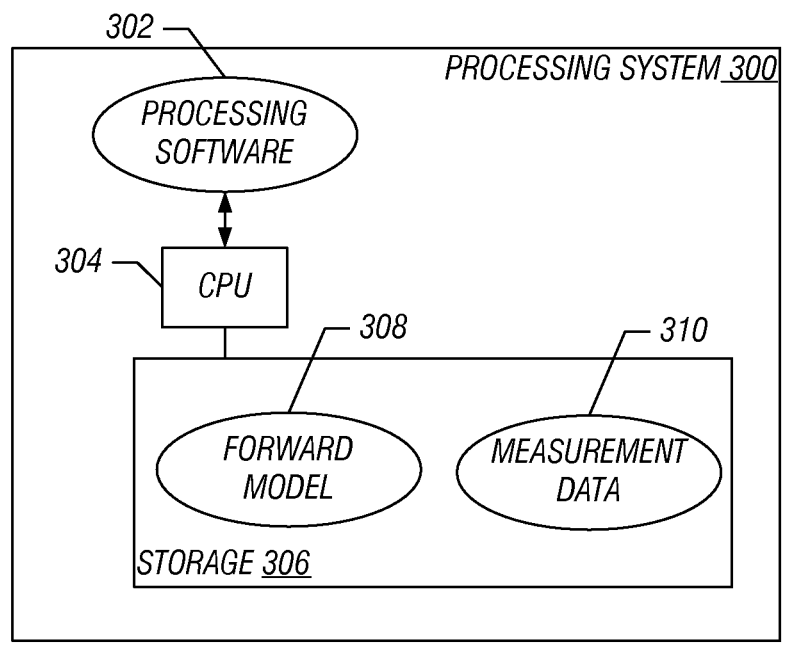
FIG. 3 is a block diagram of an exemplary processing system that is able to perform the process of FIG. 2.

The process of FIG. 2 can be performed by a processing system 300 depicted in FIG. 3. The processing system 300 includes processing software 302 executable on one or more central processing units 304, which is (are) connected to a storage 306.

The storage 306 is used to store a forward model 308 (reduced order model constructed according to some embodiments). The storage 306 also contains measurement data 310, such as electric field and/or magnetic field measurement data, which can be accessed by the processing software 302 to generate the forward model 308.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method executed by a computer, comprising:
applying a model reduction algorithm to produce a reduced order model that is an approximation of a true model of a subterranean structure, wherein the reduced order model models a response of the subterranean structure to an electromagnetic signal, and
wherein the model reduction algorithm uses interpolating frequencies that are purely imaginary to provide a real linear system of equations that is solved to produce the reduced order model, where the real linear system does not include imaginary terms; and
generating, using the reduced order model in response to an electromagnetic signal of at least one electromagnetic transmitter, synthetic data that represents a simulated version of an expected response of the subterranean structure.

2. The method of claim 1, wherein applying the model reduction algorithm further comprises:
generating a Rational Krylov Subspace that is spanned on solutions at the imaginary interpolating frequencies.

3. The method of claim 2, further comprising:
applying a Galerkin projection onto the Rational Krylov Subspace to construct the reduced order model.

4. The method of claim 3, wherein use of the imaginary interpolating frequencies allows the reduced order model to be constructed based on solving the real linear system.

5. An article comprising at least one non-transitory computer-readable storage medium containing instructions that when executed cause a computer to:
generate a Rational Krylov Subspace that is spanned on solutions at purely imaginary interpolating frequencies;
perform a projection into the Rational Krylov Subspace to construct a reduced order model that approximates a true model of a subterranean structure, wherein the reduced order model models a response of the subterranean structure to an electromagnetic signal; and
generate, using the reduced order model in response to an electromagnetic signal of at least one electromagnetic transmitter, synthetic data structure data that represents a simulated version of an expected response of the subterranean structure.

6. The article of claim 5, wherein performing the projection comprises performing computations to solve a real linear system that is based on the purely imaginary interpolating frequencies, where the real linear system does not include imaginary terms.

7. The article of claim 5, wherein performing the projection into the Rational Krylov Subspace comprises performing a Galerkin projection into the Rational Krylov Subspace.

8. The article of claim 5, wherein the Rational Krylov Subspace is based on a computation of $(A-i\omega_j I)^{-1} b$, where A is computed from a conductivity and permeability of the subterranean structure, and b is computed based on the permeability, conductivity, and an external current, and where $\omega_j$ represents the purely imaginary interpolating frequencies.

9. The article of claim 8, wherein $i\omega_j$ is real since $\omega_j$ is purely imaginary.

10. A processing system comprising:
a processor; and
software executed on the processor to:
apply a model reduction algorithm to produce a reduced order model that is an approximation of a true model of a subterranean structure, wherein the reduced order model models a response of the subterranean structure to an electromagnetic signal, and
wherein the model reduction algorithm uses interpolating frequencies that are purely imaginary such that the model reduction algorithm is to provide a real linear system of equations to be solved to produce the reduced order model, where the real linear system does not include imaginary terms; and generate, using the reduced order model in response to an electromagnetic signal of at least one electromagnetic transmitter, synthetic data that represents a simulated version of an expected response of the subterranean structure.

11. The processing system of claim 10, wherein the model reduction algorithm involves generating a Rational Krylov Subspace that is spanned on solutions at the imaginary interpolating frequencies.

12. The processing system of claim 11, wherein the software is executable to further:
apply a Galerkin projection onto the Rational Krylov Subspace to construct the reduced order model.

13. The processing system of claim 10, wherein use of the imaginary interpolating frequencies allows the reduced order model to be constructed based on solving the real linear system.

* * * * *